United States Patent
Dore

(10) Patent No.: US 9,882,758 B2
(45) Date of Patent: Jan. 30, 2018

(54) RECEIVER AND FBMC RECEPTION METHOD WITH LOW DECODING LATENCY

(71) Applicant: Commissariat A L'Energie Atomique et aux Energies Alternatives, Paris (FR)

(72) Inventor: Jean-Baptiste Dore, Saint-Martin-le Vinoux (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 0 days.

(21) Appl. No.: 15/094,200

(22) Filed: Apr. 8, 2016

(65) Prior Publication Data

US 2016/0301554 A1    Oct. 13, 2016

(30) Foreign Application Priority Data

Apr. 10, 2015  (FR) ...................... 15 53123

(51) Int. Cl.
*H04L 5/12*     (2006.01)
*H04L 27/26*    (2006.01)
*H04B 1/16*     (2006.01)

(52) U.S. Cl.
CPC ............ *H04L 27/265* (2013.01); *H04B 1/16* (2013.01); *H04L 27/264* (2013.01); *H04L 27/2649* (2013.01)

(58) Field of Classification Search
CPC .................................................. H04L 27/265
USPC ......................................................... 375/261
See application file for complete search history.

(56) References Cited

U.S. PATENT DOCUMENTS

| | | | |
|---|---|---|---|
| 6,741,551 B1* | 5/2004 | Cherubini | H04L 5/1438 370/210 |
| 2005/0122947 A1* | 6/2005 | Wang | H04L 5/026 370/342 |
| 2007/0133388 A1* | 6/2007 | Lee | H04B 7/155 370/206 |
| 2014/0192925 A1* | 7/2014 | Li | H04L 25/08 375/297 |

OTHER PUBLICATIONS

French Preliminary Search Report dated Feb. 1, 2016 in French Application 15 53123, filed on Apr. 10, 2015 ( with English Translation of Categories of Cited Documents).
Maurice Bellanger "Efficiency of filter bank multicarrier techniques in burst radio transmission", IEEE Globecom 2010 proceedings, 2010, 4 pages.

(Continued)

*Primary Examiner* — Lihong Yu
(74) *Attorney, Agent, or Firm* — Oblon, McClelland, Maier & Neustadt, L.L.P.

(57) ABSTRACT

The invention relates to a receiver and a FBMC reception method making it possible to reduce the decoding latency time and to increase the data rate in a communication system using a handshake exchange protocol or a TDMA access protocol. The receiver introduces zero padding values in place of the last samples of the last block of samples of a FBMC packet, without waiting for the end of this packet. The decoding of the FBMC packet is thus decoded more rapidly, without significant degradation of the error rate and without reduction of the out-of-band rejection rate of the FBMC signal.

12 Claims, 8 Drawing Sheets

(56) References Cited

OTHER PUBLICATIONS

Botaro Hirosaki "An Orthogonally Multiplexed QAM System Using the Discrete Fourier Transform", IEEE Transactions on Communications, vol. Com-29, No. 7, 1981, 8 pages.

Pierre Siohan et al. "Analysis and Design of OFDM/OQAM Systems Based on Filterbank Theory", IEEE Transactions on Signal Processing, vol. 50, No. 5, 2002, 14 pages.

* cited by examiner

RECEIVER AND FBMC RECEPTION METHOD WITH LOW DECODING LATENCY

TECHNICAL FIELD

The present invention relates, generally speaking, to the field of telecommunication systems using filter bank multi-carrier modulation, also designated FBMC (Filter Bank Multi-Carrier) systems.

STATE OF THE PRIOR ART

Telecommunication systems using multi-carrier modulation are well known in the prior art. The principle of such modulation consists in dividing the transmission band into a plurality of frequency sub-channels associated with sub-carriers and modulating each of these sub-carriers by the data to transmit.

The most widespread multi-carrier modulation is without any doubt OFDM (Orthogonal Frequency Division Multi-plexing) modulation. This is implemented in wireless local area networks (WLAN), WiFi, wireless broadband internet access (WiMAX), digital broadcasting systems (DVB-T, ISDB-T, DAB), asymmetric digital subscriber lines (xDSL), fourth generation cellular telephony (LTE), etc.

The spectral occupation of an OFDM signal is nevertheless substantially more important than the band of sub-carriers that it uses. In fact, since the time localisation of the signal is very good (the signal is delimited by a time slot), the frequency localisation is not good (sinc function secondary lobes spreading out-of-band). Consequently OFDM modulation is not an optimal solution for applications requiring high out-of-band rejection rates.

Filter bank or FBMC (Filter Bank Multi-Carrier) modulation may be used as an alternative to OFDM modulation.

The principle of FBMC modulation is based on a synthesis by filter bank at transmission and an analysis by filter bank at reception. The filters used are constituted of frequency shifted versions of a low-pass prototype filter satisfying the Nyquist criterion.

A detailed description of FBMC modulation will be found in the article of B. Hirosaki entitled "An orthogonally multiplexed QAM system using the discrete Fourier transform" published in IEEE Trans on Comm., vol. 29 No. 7, pp. 982-989, July 1981, as well as in the article of P. Siohan et al. entitled "Analysis and design of OFDM/OQAM systems based on filterbank theory" published in IEEE Trans. on Signal Processing, vol. 50, No 5, pp. 1170-1183, May 2002.

In the frequency domain, a FBMC signal may be represented by the response of the synthesizing filter bank, namely the response of the prototype filter, translated to the different frequencies of the sub-carriers. The out-of-band spread then does not exceed the double of the frequency difference between adjacent sub-carriers. In other words, a non-modulated sub-carrier suffices to isolate two independent groups of sub-carriers.

This good frequency localisation of the signal is paid correlatively by a time spread of the FBMC symbols. When a packet constituted of a large number of FBMC symbols is transmitted, the time spread is negligible vis-à-vis the duration of the packet. Conversely, when the packets of FBMC symbols are of small size, notably when the payload of the signal is low with regard to that of the preamble, the time spread may become very penalising in terms of rate.

This situation is encountered in the case of a communication protocol known as a handshake protocol between a transmitter (e.g. a source terminal) and a receiver (e.g. a destination terminal).

This communication protocol is illustrated in FIG. 1.

The packet of FBMC symbols is transmitted by the source during an interval of duration $T_{data}$. This duration comprises an establishment time $\tau$, a duration $N_s T$ corresponding to the $N_s$ symbols to transmit, where T is the duration of a symbol, as well as a decrease time also equal to $\tau$. It may be shown that the time $\tau$ is equal to $(K-\frac{1}{2})T$ (in the case of an OQAM modulation) where K is the overlapping factor, that is to say the number of successive FBMC symbols overlapping over time.

Thus, if $t_{end}$ denotes the instant of transmission of the last FBMC symbol of the packet, this packet will be time spread up to the time $t_{end}+\tau$. Moreover, if $\sigma$ denotes the propagation time of the signal between the source terminal and the destination terminal, the decoding of the packet ends at the earliest at the instant $t_{end}+\tau+\sigma$. After having decoded the packet, the destination terminal transmits an acknowledgement message to the source terminal. In the same way as previously, the source terminal will only be able to recognise the confirmation of receipt at time $t_{end}^{ack}+\tau+\sigma$ where $t_{end}^{ack}$ is the end of the acknowledgment message. It will thus be understood that the transmission of a data packet according to this protocol is penalised by a latency time $2\tau$, due to the time spread of the FBMC signal.

Another situation in which the time spread of the FBMC symbols penalises the data rate concerns the use of a TDMA (Time Division Multiple Access) communication protocol. According to this protocol, access to the common transmission resource (here all of the N sub-channels) is divided into transmission time intervals enabling different users to transmit their packets of data during the intervals that have been respectively allocated to them.

When the different users transmit their packets by means of a FBMC modulation, the time occupancy of the transmission intervals is not optimal. In fact, the rise and descent times of the OFDM signal lead to a time occupancy rate of the transmission intervals of the order of $(T_{tdma}-2\tau)/T_{tdma}$ where $T_{tdma}$ is the duration of a transmission interval, as represented in the chronogram (a) of FIG. 2. In order to reduce the time occupancy rate of the transmission intervals, it is possible to reduce the size of these intervals at the price of a time overlap of the successive FBMC packets and thus an increase in the level of interference, as illustrated in the chronogram (b) of FIG. 2.

In order to reduce the time spread of a packet of FBMC symbols, it has been proposed in the article of Bellanger entitled "Efficiency of filter bank multicarrier techniques in burst radio transmission" published in IEEE. Proc. of Global Telecommunications Conference (GLOBECOM 2010), pp. 1-4, December 2010, to truncate the impulse response of the prototype filter used by the transmitter.

FIG. 3 represents the impulse response of the prototype filter truncated to reduce the time spread of the FBMC symbols. This truncation is obtained by a time windowing, 300, centred on the maximum of the impulse response.

Nevertheless, if this truncation effectively makes it possible to reduce the latency time (in the first situation evoked above) or to increase the transmission rate (in the second situation evoked above), it degrades the spectral properties of the signal, the gain in time localisation obtained by the time windowing is reflected by a loss in frequency localisation. More precisely, the multiplication of the signal by a time window is reflected in a convolution with a sinc function in the frequency domain and thus the appearance of secondary lobes in the transmission spectrum. The out-of-band rejection rate is consequently degraded.

The aim of the present invention is consequently to reduce the latency time of a FBMC communication and more generally to enable more rapid decoding of a packet of FBMC symbols, without introducing any degradation of the out-of-band rejection level.

DESCRIPTION OF THE INVENTION

The present invention is defined by a FBMC receiver intended to receive at least one packet of FBMC symbols, the FBMC symbols being transmitted by means of a plurality N of sub-channels and following one another at a frequency f=1/T with an overlapping factor K, the receiver comprising a sampler to sample at the frequency Nf the signal received in baseband, a serial-parallel converter to form blocks of successive samples of size KN, a FFT module to carry out a FFT of size KN on each of said blocks, a battery of analysis filters to carry out a filtering and a spectral despreading on the frequency components at the output of the FFT module, said receiver further comprising a first multiplexer to pad with zero values a first plurality ($M_z$) of the last samples of the last block of the FBMC packet at the input of the FFT module, without waiting for the end of reception of the FBMC packet.

According to an advantageous embodiment example, the overlapping factor is equal to 4 and said first plurality of samples is equal to KN/3 to some 10%.

The receiver may further comprise a second multiplexer at the input of the FFT module to pad with zero values a second plurality of the first samples of the first block of the FBMC packet.

In this case, if the overlapping factor is equal to 4, the second plurality of samples may also be equal to KN/3 to some 10%.

The invention also relates to a method of reception at least one packet of FBMC symbols, the FBMC symbols being transmitted by means of a plurality N of sub-channels and following one another at a frequency f=1/T with an overlapping factor K, said method comprising a sampling at the frequency Nf of the signal received in baseband, a serial-parallel conversion to form blocks of successive samples of size KN, a FFT of size KN on each of said blocks thereby obtained, a filtering and a spectral despreading, in the frequency domain, of the frequency components at the output of the FFT. This reception method is advantageous in that it comprises, prior to the FFT, a first step of padding with zero values a first plurality ($M_z$) of the last samples of the last block of the FBMC packet, the step of padding being carried out without waiting for the end of reception of the FBMC packet.

According to an advantageous embodiment example, the overlapping factor is equal to 4 and said first plurality of samples is equal to KN/3 to some 10%.

The reception method may further comprise, prior to the FFT, a second step of padding with zero values a second plurality of the first samples of the first block of the FBMC packet.

In this case, if the overlapping factor is equal to 4, the second plurality of samples may advantageously be chosen equal to KN/3 to some 10%.

The reception method may further implement an equalization of the frequency components prior to the step of filtering and spectral despreading.

Finally, said reception method may comprise a step of OQAM demodulation after the step of filtering and spectral despreading.

BRIEF DESCRIPTION OF THE DRAWINGS

Other characteristics and advantages of the invention will become clear on reading preferential embodiments and referring to the appended figures among which.

DETAILED DESCRIPTION OF PARTICULAR EMBODIMENTS

Figure 4:
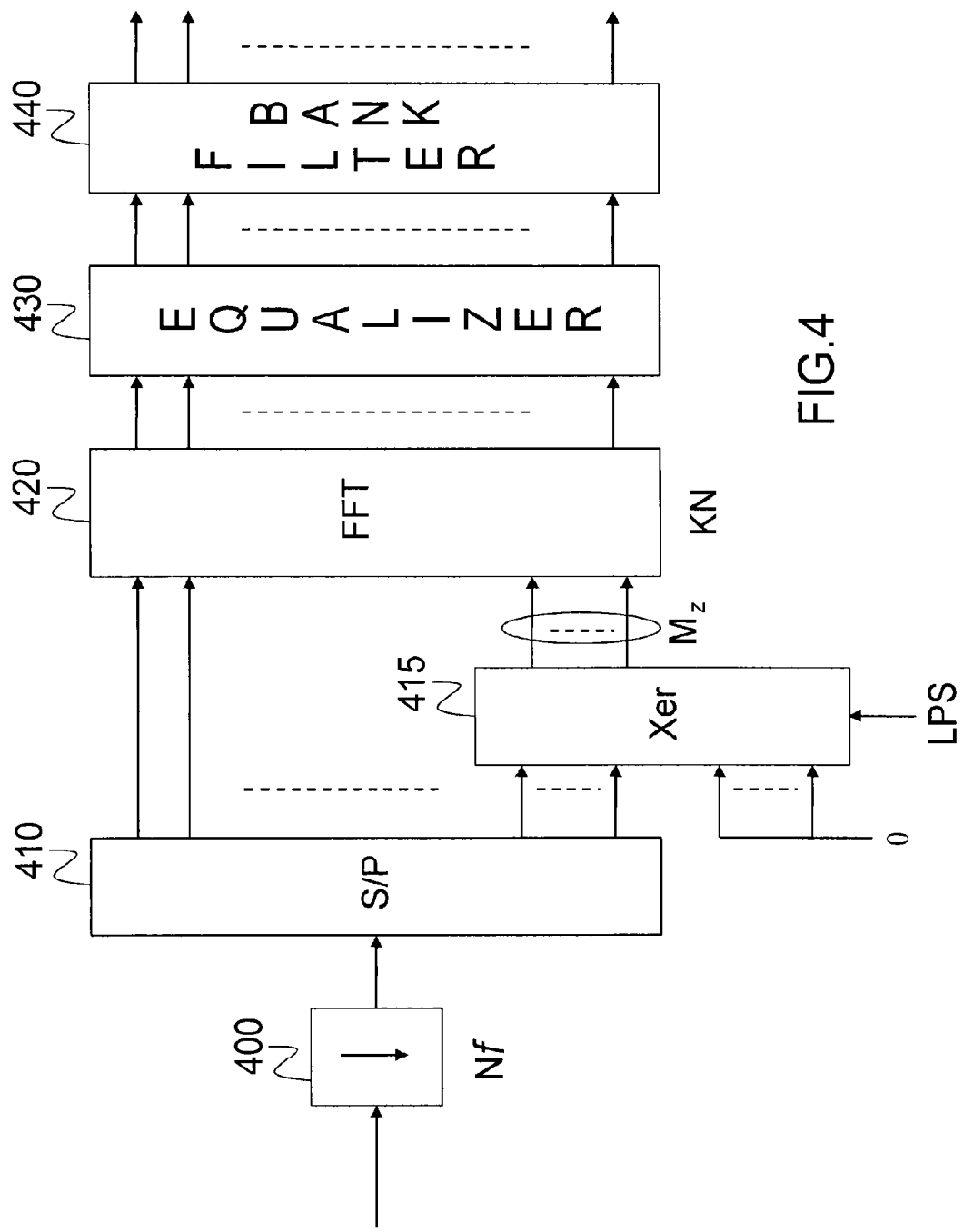
FIG. 4 schematically represents the architecture of a FBMC receiver according to a first embodiment of the invention.

The basic idea of the present invention is not to window the FBMC signal at the level of the transmitter and in particular not to truncate the impulse response of the prototype filter but on the contrary to carry out a treatment at the level of the receiver while padding the last samples of the last block received with zeros before carrying out the FFT. It has in fact been able to be shown that it is possible to only use a partial information to decode the last FBMC symbols. FIG. 4 schematically represents the structure of an FBMC receiver according to a first embodiment of the invention.

The FBMC signal received, after having been demodulated in baseband, is sampled by a sampler, 400, at the frequency Nf where $f=1/T_s$ is the symbol frequency. The successive samples are grouped together, by a serial/parallel converter, 410, in the form of blocks of length KN where K is the overlapping factor.

A sliding FFT (the window of the sliding FFT of KT between two FFT calculations) is carried out by means of a FFT module, 420, of KN consecutive samples.

A multiplexer, 415, at the input of the FFT module, replaces the $M_z$ last samples of the block corresponding to the last FBMC symbol of the packet by zeros. This multiplexer is commanded by a command signal LPS, for example from a counter (not represented) indicating the last FBMC symbol of the packet.

Thus, it will be understood that the receiver does not have to wait for the $M_z$ last samples of the last block of the packet to carry out the last FFT operation. The frequency components at the output of the FFT are then subjected, if need be, to an equalization in the frequency domain, in the equaliser

430. The equaliser is nevertheless an optional element of the invention, depending on the transfer function of the transmission channel.

After possible equalization, the outputs of the FFT are filtered and spectrally despread by the battery of analysis filters, 440. More precisely, if $P \hat{d}_{i,k}$ are the samples corresponding to the 2K−1 frequencies (i−1)K+1, . . . , iK, . . . ,(i+1)K−1 of the FFT (that is to say the frequencies of the $i^{th}$ sub-channel), the battery of filters provides (for this $i^{th}$ sub-channel) the sample:

$$d_i = \sum_{k=-K+1}^{K-1} G_k d_{i,k}$$

where the coefficients $G_k$ are the values of the transfer function of the analysis filter (translated to the frequency iK of the transfer function of the prototype filter).

The data $d_i$ thereby obtained may undergo a plurality of operations, reserve to those implemented in the FBMC transmitter. For example, if the data have been subjected to a OQAM modulation (Offset QAM) at the level of the transmitter, the data $d_i$ then undergo a OQAM demodulation, in a manner known per se. Similarly, if the data have been coded by a channel coding and modulated by means of a Q-ary symbol modulation according to an MCS (Modulation and Coding Scheme) at the level of the transmitter, the reverse operations are carried out at the level of the receiver.

Figure 5:
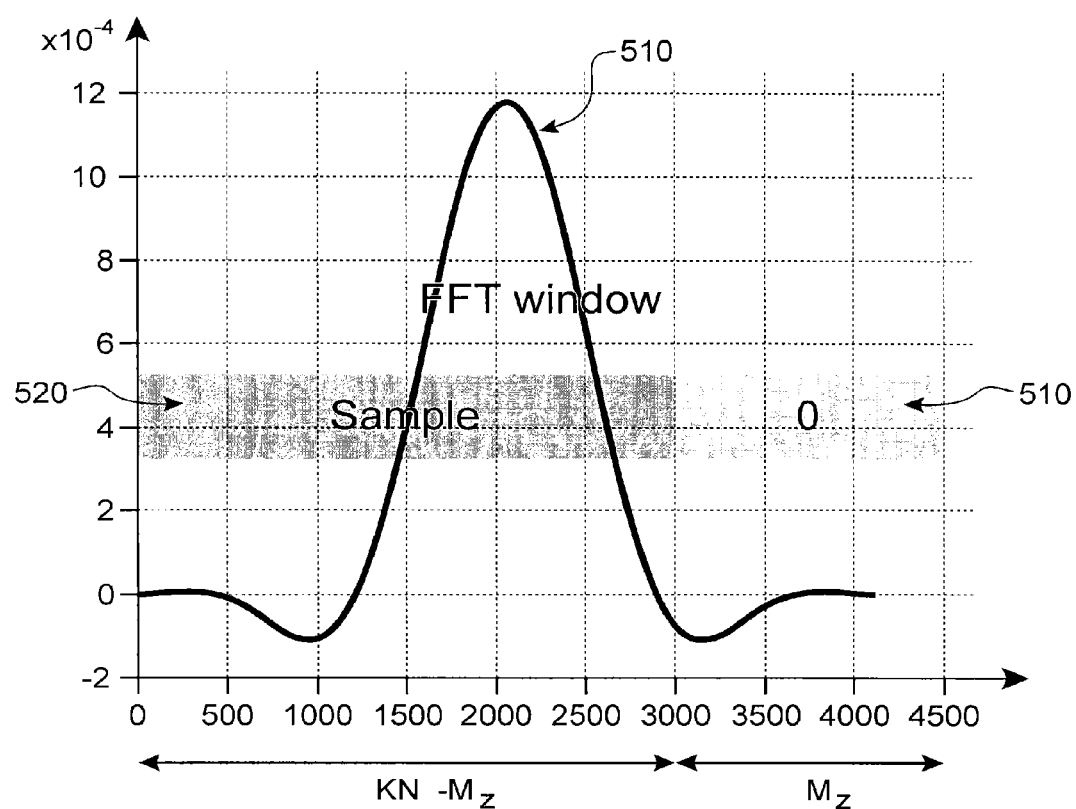
FIG. 5 represents the principle of zero padding of the samples of the last FBMC symbol of a packet received by the receiver of FIG. 4.

FIG. 5 illustrates the principle of the treatment of the last block of samples obtained of the FBMC packet. On the X-axis is represented the rank of the sample for KN consecutive samples at the input of the FFT and on the Y-axis the amplitude. The waveform 510 is that of a FBMC signal corresponding to a single sub-channel and thus corresponds to the impulse response of the prototype filter. It may be seen that the last input block of the FFT module is constituted of KN−$M_z$ samples of the signal, 520, and $M_z$ samples of padding constituted by zero values, 530. Thus, the receiver does not have to wait for the end of the time spread of the last FBMC symbol to terminate the decoding of the packet. In other words, the last FBMC symbol(s) (to take account of the overlapping of these symbols) are decoded on the basis of a partial information.

It has been able to be shown that this zeroing of the end of the last block of samples only slightly affects the performances of the decoding of this block.

Figure 6:
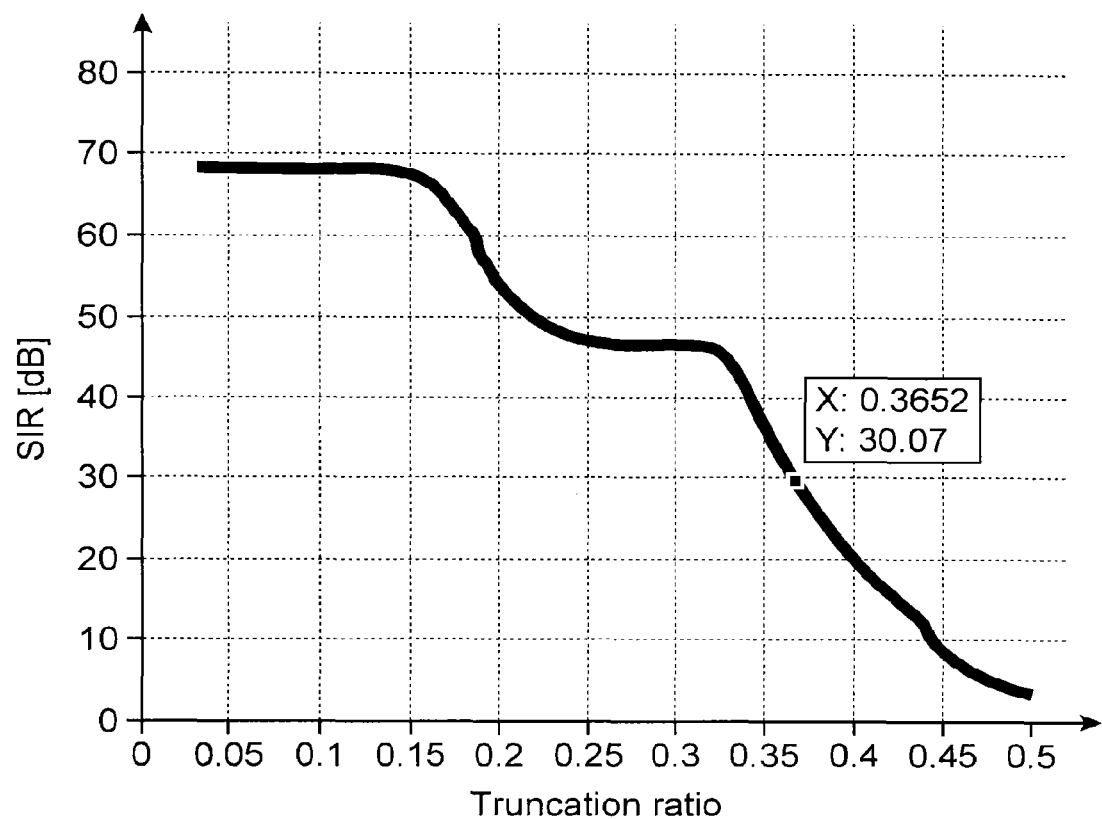
FIG. 6 represents the change in the signal to interference ratio at the level of the receiver as a function of the zero padding rate.

FIG. 6 represents the change in the signal to interference ratio as a function of the rate of padding the last block with zeros. More precisely, the padding rate designates the ratio $M_z$/NK. Here K=4 and N=1024 are taken for example.

It may be seen that the signal to interference ratio remains constant as long as the padding rate remains below 0.15 then decreases to observe a plateau up to a padding rate of around ⅓, then again decreases.

Depending on the desired minimum SIR level, in other words depending on the maximum acceptable binary error rate (BER), it is possible to determine by means of this curve the maximum padding rate. For example, in the case illustrated if it is wished to have a signal to interference ratio above 45 dB a padding rate close to 0.3 will be chosen. It will thus be understood that a time of around T/3 is gained compared to a conventional FBMC demodulation while retaining a very good out-of-band rejection rate since the FBMC signal transmitted is unchanged.

Generally speaking, for an overlapping factor K=4, the zero padding rate of the last block is chosen equal to KN/3.

Figure 7A:
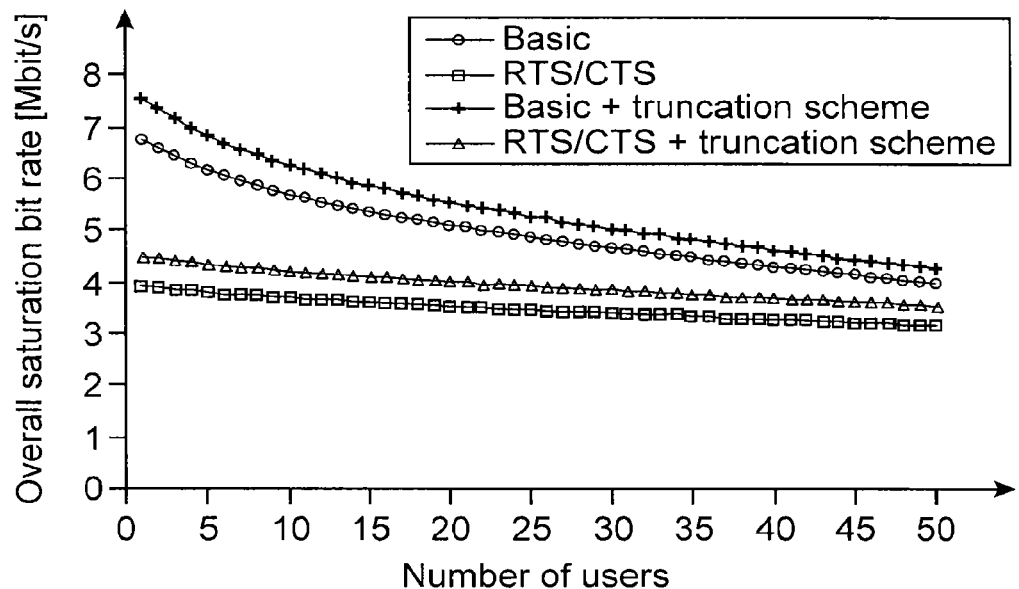
FIGS. 7A and 7B represents the variation in the rate in saturated mode as a function of the number of users for two separate sizes of packets.
Figure 7B:
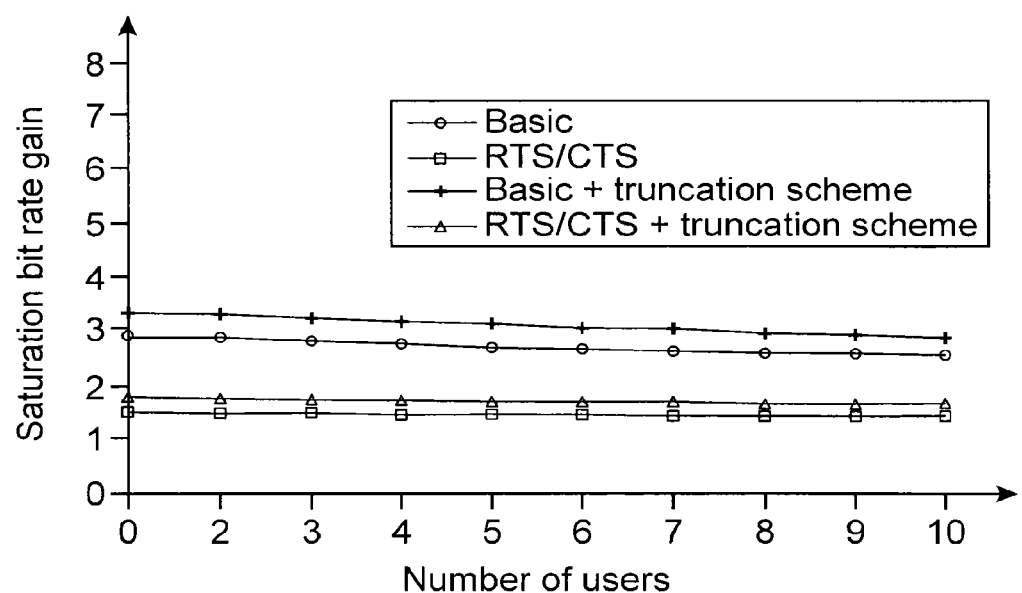

FIGS. 7A and 7B represent the rate in saturated mode of a FBMC communication system as a function of the number of users. Two handshake protocols have been envisaged here. The first protocol is a basic version of resource access sharing known as CSMA/CA (Carrier Sense Multiple Access with Collision Avoidance) implementing two handshakes and the second protocol is an advanced version, using two additional RTS/CTS (Request To Send/ Clear To Send) signalisation signals and implementing four handshakes between the transmitter and the receiver.

For each of these two protocols, the performances of a FBMC reception with a padding of zeros as described above is also represented.

For these two protocols, a MCS scheme has been used with a channel coding of output R=¾ and a 16 QAM modulation.

FIG. 7A corresponds to a size of packet of 1500 octets and FIG. 7B to a size of packet of 500 octets. It will be noted that at saturation, the gain in rate is some 10% for a size of packet of 1500 octets and some 16% for a size of packet of 500 octets. As predicted, the smaller the packet size the greater the gain.

Figure 8:
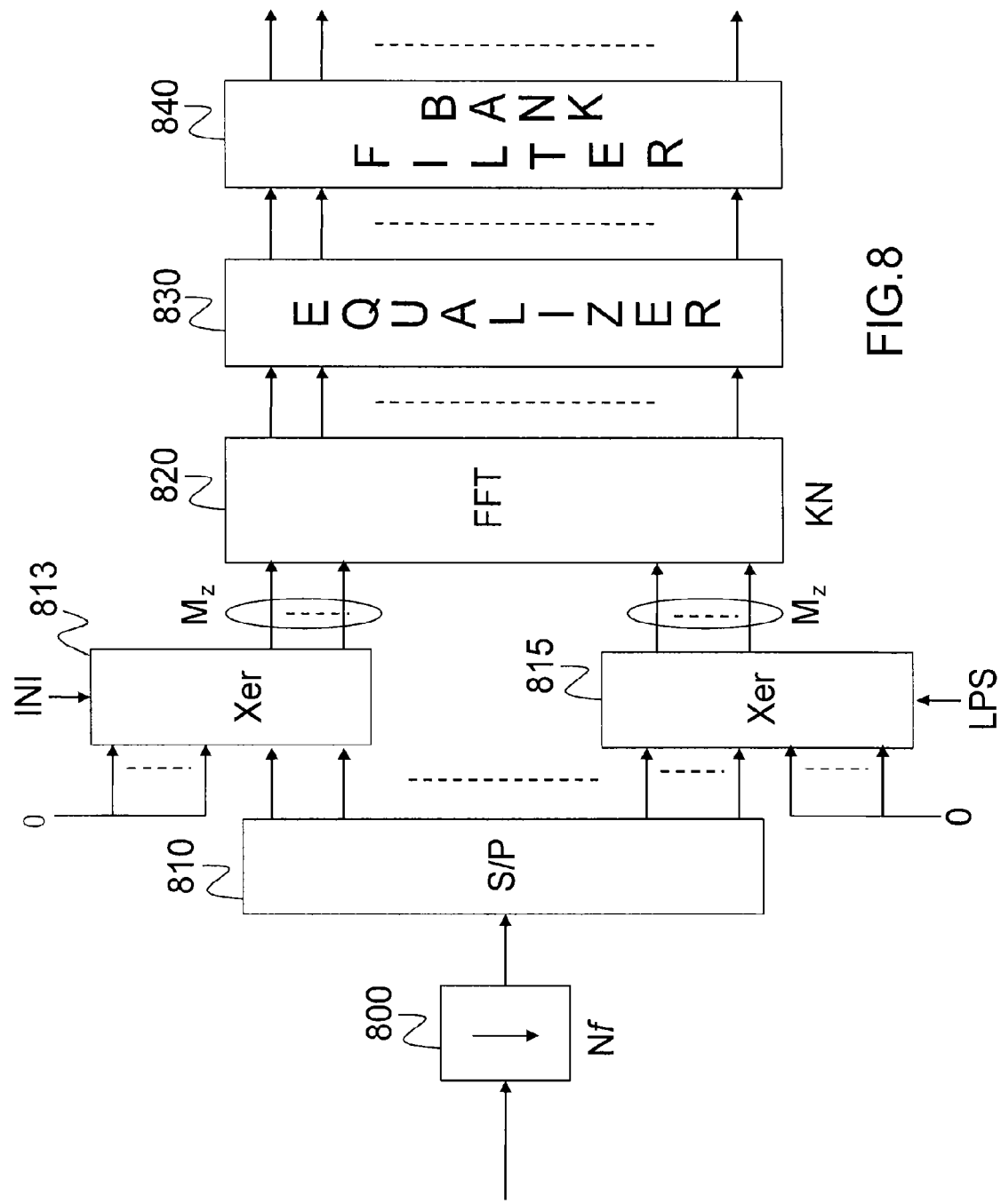
FIG. 8 schematically represents the architecture of an FBMC receiver according to a second embodiment of the invention.

FIG. 8 schematically represents the structure of a FBMC receiver according to a second embodiment of the invention.

Unlike the first embodiment, the zero padding here intervenes both at the start of the first block of samples and at the end of the last block of samples of the FBMC packet.

As in FIG. 4, the FBMC signal received is demodulated in baseband then sampled at the frequency Nf. The successive samples are grouped together, in a serial/parallel converter, 810, in the form of blocks of length KN where K is the overlapping factor.

The FFT module 820 carries out a sliding FFT on a block of KN consecutive samples.

A second multiplexer, 815, at the input of the FFT module, 820, replaces the $M_z$ last samples of the block corresponding to the last FBMC symbol of the packet by zeros. In a similar manner, a second multiplexer, 813, at the input of the FFT module, 820, replaces the $M_z$ first samples of the block corresponding to the first FBMC symbol of the packet by zeros. According to a variant, the number of zeroed samples may be different for the first and second multiplexers.

The first multiplexer is commanded by an initialisation signal, INI, indicating the start of a new packet. The second multiplexer is commanded by a command signal LPS, from a counter, indicating the last FBMC symbol of the packet, as in the first embodiment.

Figure 1:
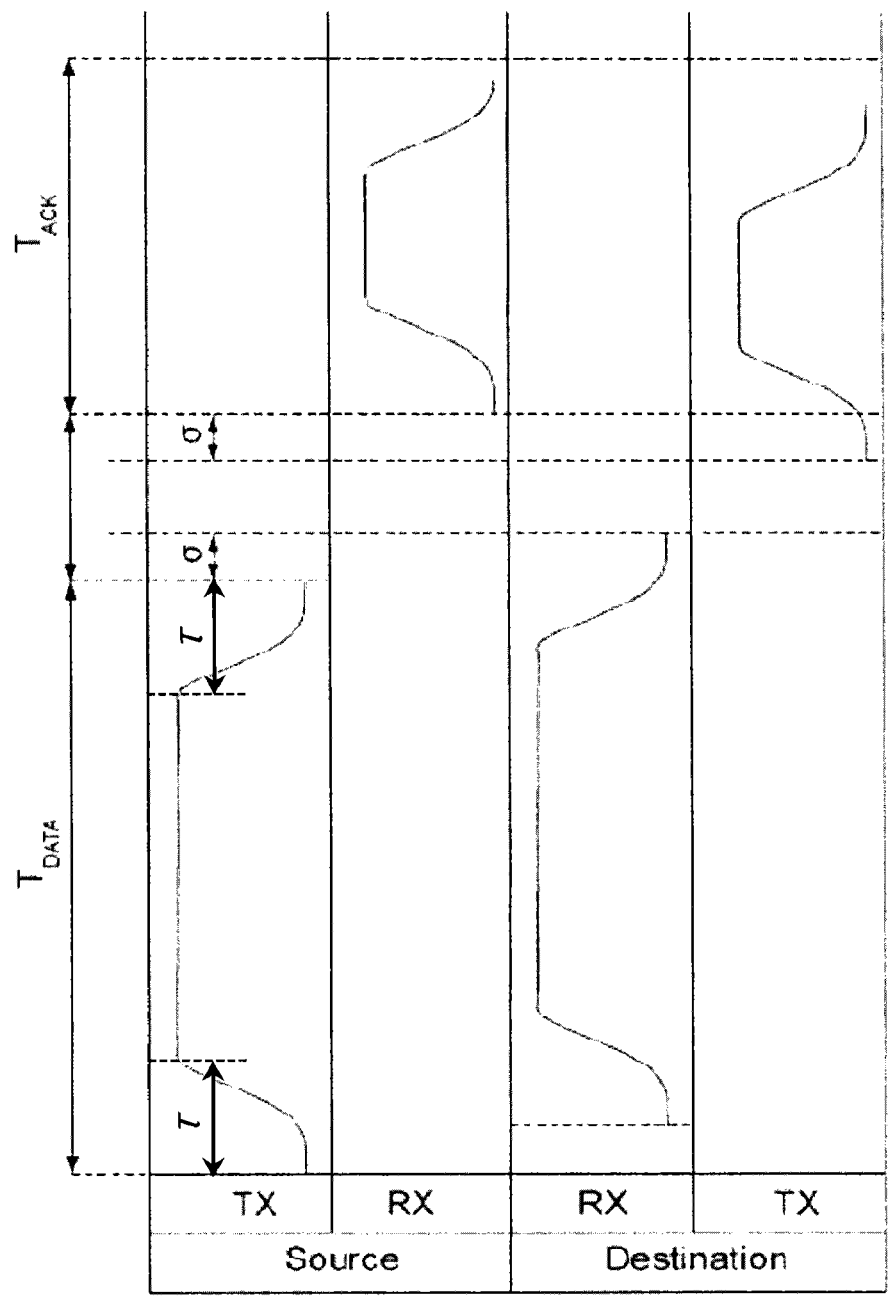
FIG. 1 represents in a schematic manner a communication between a transmitter and a FBMC receiver using a handshake protocol.
Figure 2:
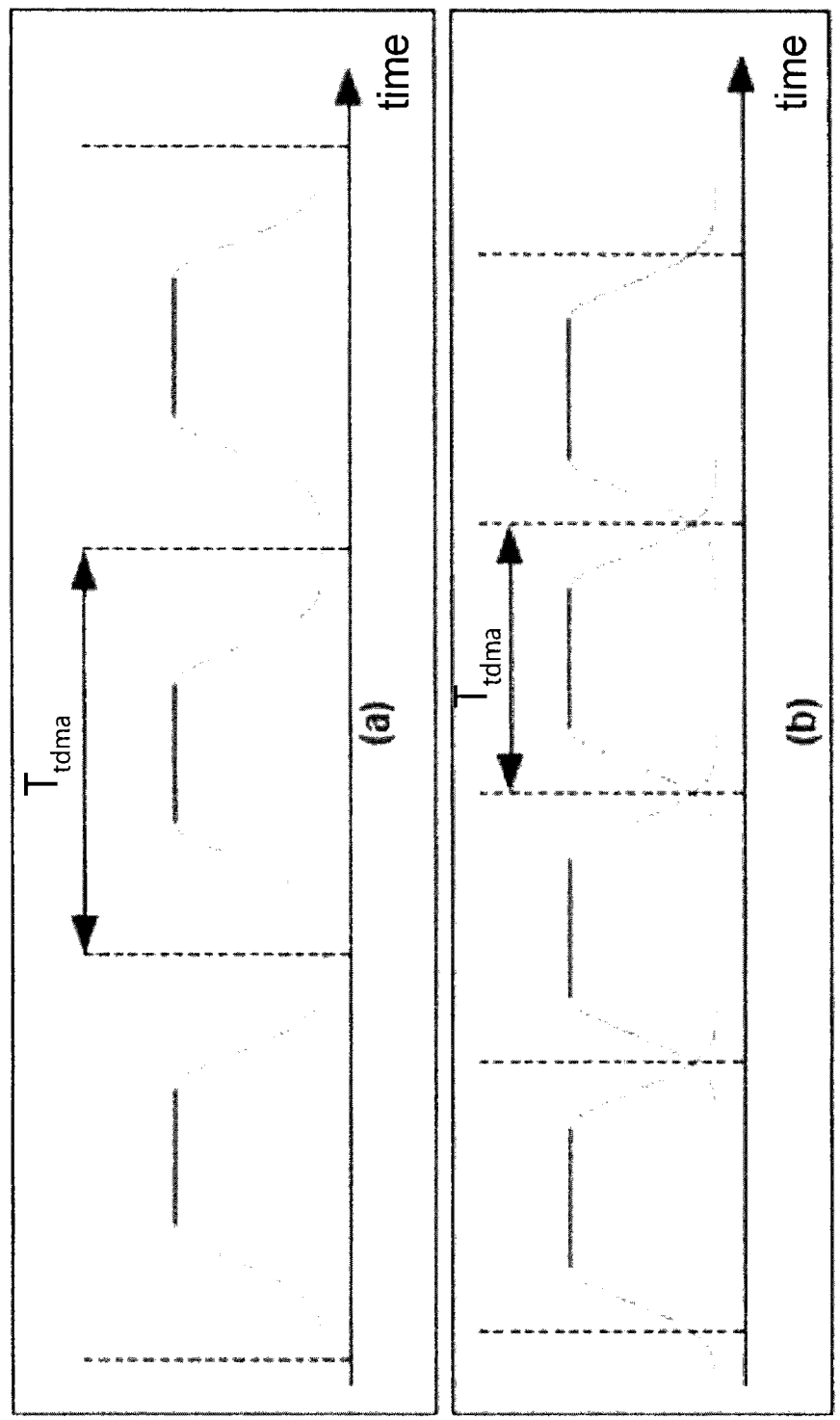
FIG. 2 represents two chronograms of transmission of FBMC packets in TDMA mode.
Figure 3:
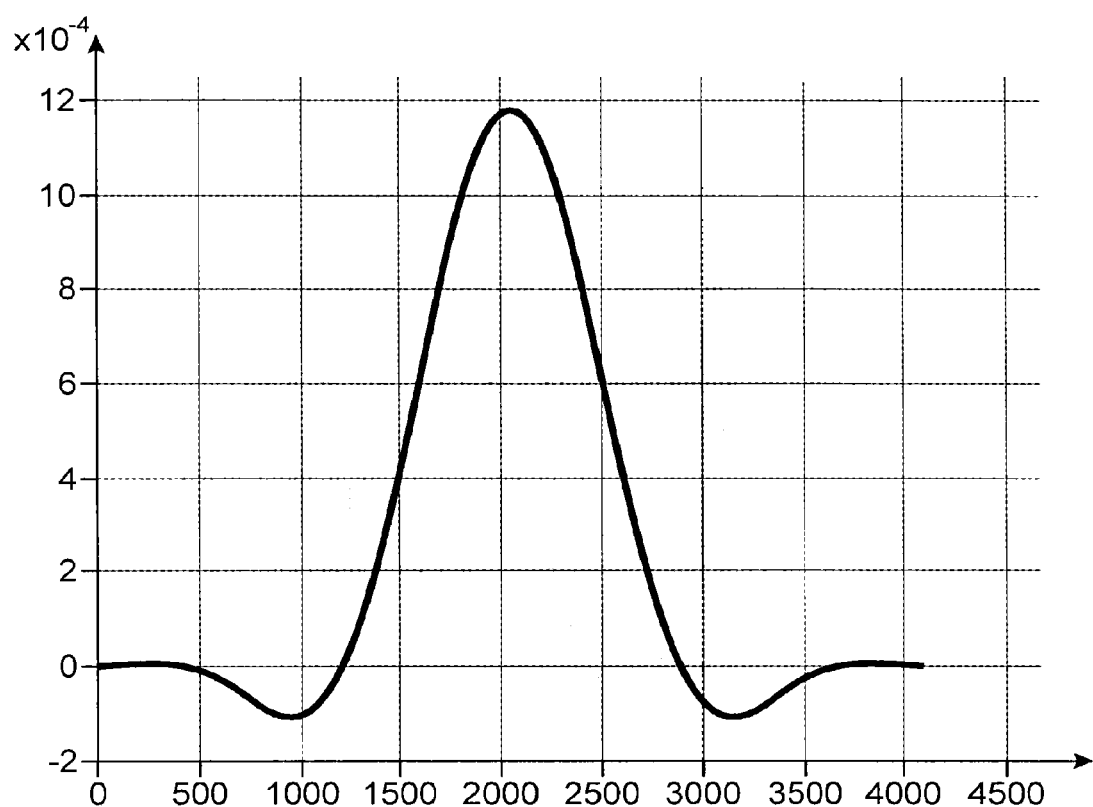
FIG. 3 represents the impulse response of a prototype filter, time truncated.

Thus, the receiver does not take account of the time spread of the first symbol and the last symbol of the FBMC packet for the decoder. It is then possible to reduce the size of the transmission intervals as in the chronogram (b) of FIG. 2 without degrading the level of interference and thus without increasing the error rate.

As in the first embodiment, the frequency components at the output of the FFT are subjected to a potential equalization in the frequency domain by the equaliser 830, then to a filtering and a spectral despreading by the battery of analysis filters, 840.

As in the first embodiment, also, the data at the output of the battery of filters, 840, may then be subject to a OQAM demodulation, a binary symbol demodulation followed by a channel decoding, as a function of the operations carried out on the side of the transmitter.

The invention claimed is:

1. A filter bank multi-carrier (FBMC) receiver configured to receive at least one packet of FBMC symbols N K, the receiver comprising:
    a sampler to sample at the frequency Nf a FBMC packet received in baseband, the FBMC symbols in the received FBMC packet being transmitted with a plurality N of frequency sub-channels and following one another at a frequent f=1/T with an overlapping factor K, where T is a symbol duration;
    a serial-parallel converter to form blocks of successive samples of size KN, a fast Fourier transformation (FFT) module to carry out a FFT of size KN on each of said blocks;
    a battery of analysis filters to carry out a filtering and a spectral despreading on frequency components at the output of the FFT module; and
    a first multiplexer to pad with zero values a first plurality ($M_z$) of last samples of a last block of the FBMC packet at the input of the FFT module, without waiting for an end of reception of the FBMC packet.

2. The FBMC receiver according to claim 1, wherein the overlapping factor is equal to 4 and a first plurality of samples is equal to KN/3 to within 10%.

3. The FBMC receiver according to claim 1, further comprising a second multiplexer at the input of the FFT module to pad with zero values a second plurality of first samples of a first block of the FBMC packet.

4. The FBMC receiver according to claim 1, wherein the overlapping factor is equal to 4 and a second plurality of samples is equal to KN/3 to within 10%.

5. The FBMC receiver according to claim 1, wherein the receiver is configured to analyse multicarrier signals, including the FBMC packet, based on an analysis filter bank including frequency shifted versions of a prototype filter.

6. A method of receiving at least one packet of filter bank multi-carrier (FBMC) symbols, N K said method comprising:
    sampling at the frequency Nf of a FBMC packet received in baseband, the FBMC symbols of the received FBMC packet being transmitted with a plurality N of frequency sub-channels and following one another at a frequency f=1/T with an overlapping factor K, where T is a symbol duration;
    a serial-parallel conversion to form blocks of successive samples of size KN, a FFT of size KN on each of said blocks thereby obtained;
    a filtering and a spectral despreading, in the frequency domain, of frequency components at the output of the fast Fourier transformation (FFT); and
    prior to the FFT, a first step of padding with zero values a first plurality ($M_z$) of last samples of a last block of the FBMC packet, the step of padding being carried out without waiting for an end of reception of the FBMC packet.

7. The method according to claim 6, wherein the overlapping factor is equal to 4 and said first plurality of samples is equal to KN/3 to within 10%.

8. The method according to claim 6, further comprising, prior to the FFT, a second step of padding with zero values a second plurality of first samples of a first block of the FBMC packet.

9. The method according to claim 8, wherein the overlapping factor is equal to 4 and the second plurality of samples is equal to KN/3 to within 10% .

10. The method according to claim 5, comprising an equalization of the frequency components prior to the step of filtering and spectral despreading.

11. The method according to claim 6, comprising an offset modulation demodulation after the step of filtering and spectral despreading.

12. The method according to claim 6, said method comprising analysing multicarrier signals, including the FBMC packet, based on an analysis filter bank including frequency shifted versions of a prototype filter.

* * * * *